Patented June 28, 1938

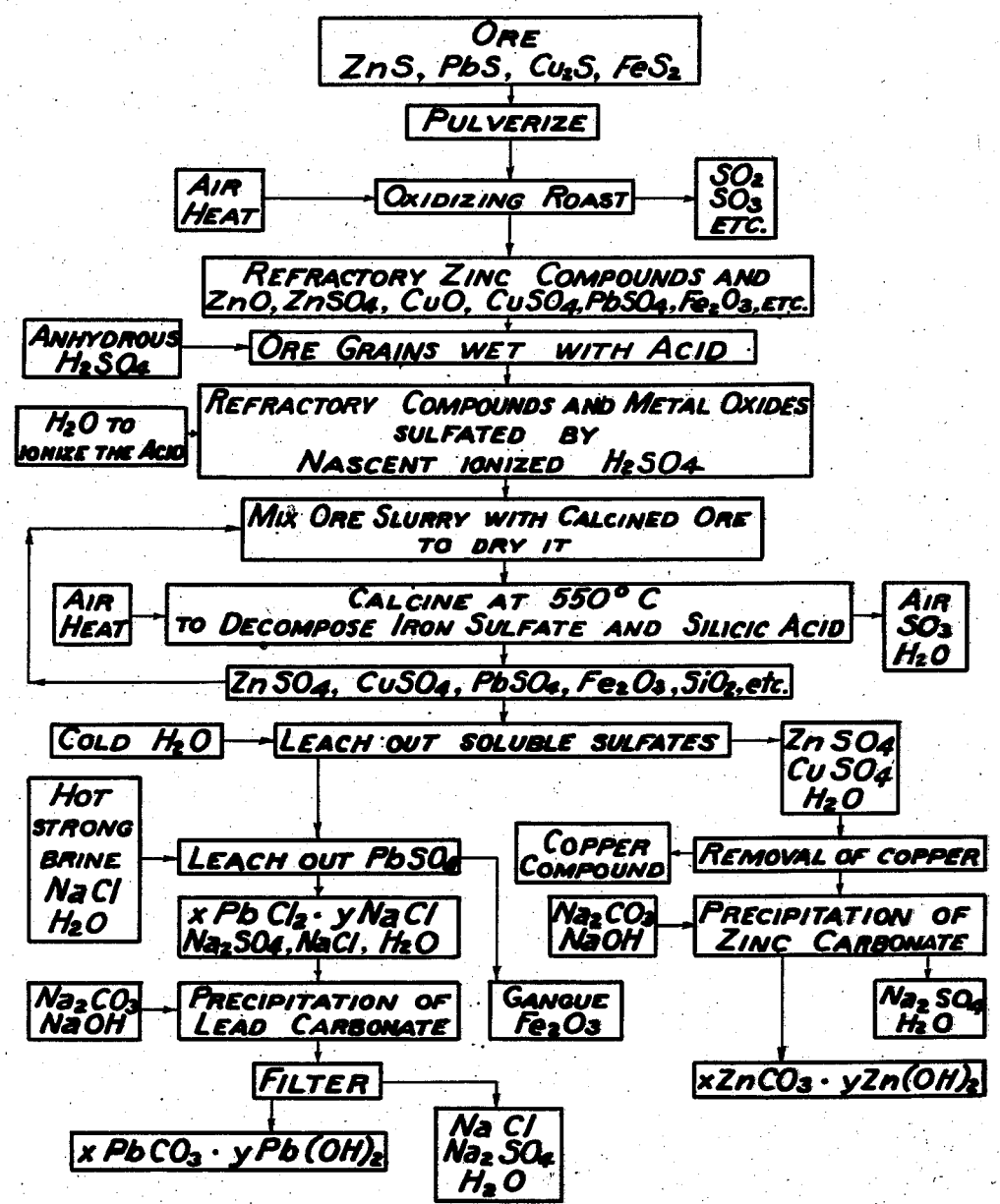

2,121,887

UNITED STATES PATENT OFFICE 2,121,887

METHOD OF SULPHATING AN ORE MATERIAL

Royal L. Sessions, Inglewood, and Donald C. Mitchell, Los Angeles, Calif., assignors to Hughes-Mitchell Processes Incorporated, Denver, Colo., a corporation of Wyoming Application December 9, 1935, Serial No. 53,576

13 Claims. (Cl. 75—115)

This invention relates to a sulphating treatment of ores, such as sulphide ores and oxidized ore materials, and especially to a process comprising the sulphating of the various metal values of a complex ore, such as a roasted or raw sulphide ore containing zinc compounds in intimate association with the compounds of lead and iron and other metals which are to be separated and recovered.

Zinc, lead and copper are found as sulphides in association with the sulphides of iron and other metals. In these complex ores, the sulphide crystals are so thoroughly intertwined that physical separation is impossible and various chemical procedures are handicapped by the interreactions between the different compounds, such as during a roasting operation. If such an ore is roasted under oxidizing conditions in accordance with standard procedure, only a part of the zinc sulphide is converted to zinc oxide and/or zinc sulphate, which are soluble in a dilute sulphuric acid solution and may be recovered as zinc sulphate. The remainder of the zinc sulphide, which may constitute 30% of the total content, is refractory to such a treatment, and this is presumably due to the formation of complex compounds of zinc and iron as zinc ferrite and complex zinc, iron and sulphur compounds. Some of the zinc may also remain as a residual sulphide or zinc silicate.

Of the numerous hydrometallurgical treatments which have been tried for recovering the metal values, such as zinc, from an ore material, it has been proposed to roast the ore and then to leach out the soluble ore metal oxide and sulphate by means of a suitable solution and then to calcine the residue with dilute sulphuric acid or other sulphating material, or to treat the roasted material with sulphur dioxide and trioxide gases for the purpose of converting the desired compounds to sulphates. Other sulphating processes involve the treatment of an unroasted sulphide ore in a strong sulphuric acid bath in the attempt to convert the sulphide directly to a sulphate. However, such procedures do not recover all of the refractory zinc and are not efficient or economical for recovering the metal values.

The primary object of this invention is to provide a hydro-metallurgical procedure for recovering substantially all of a desired metal value from an ore material by a sulphating process which serves efficiently and economically to form the metal sulphate so that it may be readily recovered as an aqueous solution.

A further object is to provide a method of recovering and separating zinc and other metals from complex ore materials wherein the process is so carried on that the material may be serially treated for the recovery of first one and then another of the metal values, and more particularly for separating the zinc, lead and iron compounds found in a complex sulphide ore and recovering substantially all of the zinc and lead compounds.

Other objects are to simplify the procedure of treating such complex ores and to provide a method wherein the ore may be treated continuously and serially in various stages which convert the zinc and lead compounds to sulphates and then separate them from the iron and other undesired compounds. Further objects will be readily apparent in view of the following disclosure.

The drawing shows as a flow diagram various steps which may be employed in treating a complex lead, zinc and iron sulphide ore for recovering and separating the metal values, and it is to be understood that this is merely illustrative of the general procedure which may be adopted for treating various ore materials and that each different type of ore may require a special treatment for recovering particular values therein.

This process is based on the discovery that when anhydrous sulphuric acid first becomes ionized by adding water thereto, it is in a state of transition in which it is highly reactive chemically. The acid at that moment of ionization may be considered as being in a nascent state. The primary feature of this invention therefore involves treating a dry oxidized ore material containing refractory metal compounds with concentrated or anhydrous sulphuric acid initially undiluted by the addition of water so as to wet the ore particles thoroughly therewith, after which water is added in sufficient amount to ionize the sulphuric acid and cause it to pass through the nascent state and thus attack the ore material while in that highly reactive chemical condition. As a result, substantially all of the zinc and the lead compounds in a roasted sulphide ore are converted to sulphates and may be readily recovered. The various other steps of the process are coordinated with this solubilizing procedure so as to prepare the ore therefor and to separate the values from the gangue.

Assuming that the ore to be treated is a complex sulphide ore containing zinc, lead and iron sulphides, together with small amounts of the compounds of other metal values, such as copper sulphide, the following procedure may be adopted for recovering all of the zinc and lead and for separating them from the iron in the ore material, as illustrated in the drawing. The ore may be first concentrated, if desired, by the physical separation of undesired rock material from the metal values. Thereafter, it is crushed or ground to a suitable size and condition for a roasting operation and the sulphide ore is then roasted in accordance with standard procedure except as herein specified. This operation may be carried on in a rotary tube having baffles therein arranged to agitate the material as the tube rotates, or the material may be roasted in a wedge type of apparatus in which the material is moved by revolving rakes from one shelf to another below it while heated by an ascending current of air.

The temperature of the roasting operation is preferably maintained as low as feasible so as to minimize the formation of the complex difficultly solubilized refractory compounds. For many ore materials, the roasting operation may be autogenous, wherein the temperature conditions and the rate of air flow are such that the sulphide sulphur of the ore burns readily by itself to form a zinc oxygen compound and sulphur dioxide and trioxide gases. It is preferred that the roasting operation be so conducted as to leave the zinc largely in the form of a sulphate rather than an oxide since it is to be recovered as that particular salt. To convert the zinc sulphate to an oxide during roasting ordinarily requires a high temperature which is likely to produce a sintered and undesired ore condition. Otherwise, it is immaterial whether the zinc be left as an oxide or a sulphate, except that the former consumes sulphuric acid during the sulphating stage. Atmospheric conditions may be maintained which convert the iron sulphide either to ferric oxide or to ferrous oxide, it being immaterial which is formed at this stage. It, moreover, is not necessary that the roasting operation be completed, since residual sulphides are readily treated in this process with the recovery of the metal values thereof. In this way and particularly by maintaining a low roasting temperature, the resultant material is not sintered or vitrified and thus comes from the roasting furnace in a granular or pulverulent condition depending upon the ore particle size initially provided. It is desirable that the ore material be pulverized to a fairly fine size, such as will pass through a screen of 100 meshes to the linear inch, so that the ore granules may be easily reached by the solubilizing reagents later employed. Various other expedients well known to those skilled in this art may be utilized in connection with this roasting operation. The oxidized ore material as thus obtained by roasting the complex zinc sulphide ore contains zinc and copper sulphates and/or oxides, lead sulphate, iron oxide, etc. as well as a large amount of refractory zinc and iron compounds. There is ordinarily as much as 30% or so of the zinc held in these refractory compounds that are not directly soluble in a dilute sulphuric acid bath.

Such a roasted ore, or an ore material derived from any other suitable source which contains refractory but sulphatable metal compounds, may now be sulphated in accordance with the primary feature of this invention. This involves adding to the substantially dry ore sufficient concentrated or substantially anhydrous sulphuric acid to react with all of the refractory and un-sulphated zinc compounds present and convert them to the sulphate after water has been added. If, for example, the ore material originally analyzed 38% zinc, then the charge may be treated in the proportions of 600 grams of ore to 207 cubic centimeters of concentrated sulphuric acid. If other unsulphated compounds are present which will be attacked by the acid, then an additional amount of acid will be employed therefor, as determined by analysis of the ore material. It is preferred that the acid be in slight excess of the theoretical amount required for sulphating the zinc, copper, and lead, although wide variations may be made in the proportions of these ingredients depending on the results desired. It is noteworthy that no large excess of acid is required for this procedure, since all of the acid is utilized in the process of sulphating the refractory values. Also, the waste of acid is minimized by the fact that the iron which is sulphated at this point is later treated for recovering the acid radical combined therewith.

Owing to the fact that the substantially anhydrous sulphuric acid is not ionized, or only to a slight extent if a little water is present, the addition of the sulphuric acid to the ore material causes substantially no reaction to take place. This step of the treatment is for the purpose of intermixing the acid thoroughly with the substantially dry ore particles and getting it into intimate contact with all of the pore and outside surfaces of the particles, so that when the reaction is started the acid wet grains will all be treated substantially simultaneously by the nascent ions.

To this acid dampened ore material, a suitable amount of water is now added to ionize the acid. For the ore material above specified, about 200 cc. of water is used. That is, substantially equal amounts of the two reagents are employed for 600 grams of roasted ore. This total amount of liquid merely makes a slurry or paste, in which the ore is present in such a large proportion that the diluted acid is located largely within the pore spaces. Immediately upon adding the water, a rapid but controllable reaction takes place between the nascent sulphuric acid and the ore material, and within the period of five to ten minutes substantially all of the zinc, lead and copper values have been converted to sulphates. The sulphating treatment has been substantially completed at this point; although it is possible that the nascent sulphur trioxide later evolved by calcining the iron sulphate within the ore material may also aid in sulphating the ore. Some portion of the acid is initially taken up by the iron, but eventually all of the sulphate radical that remains is attached only to the non-ferrous values.

When the water is added to the ore material dampened with the concentrated $H_2SO_4$, heat is generated rapidly and this presumably aids materially in the reaction. No extraneous heat is required. The amount of water added may be widely varied, depending upon the quantity of acid added and the particular effects desired, as determined by analysis of the ore. The primary condition as above explained is that enough water be added to dissociate the sulphuric acid and produce the ionized nascent condition which will cause it to attack the ore particles with extreme rapidity. The rate and violence of the reaction may be controlled by varying the degree of dilution of the acid. Although the addition of a small amount of water directly to concentrated sulphuric acid is almost explosive in nature, yet it may be added to the acid wet ore at a controlled rate and the reaction will be controlled accordingly. This control is permitted by the fact that the acid is widely distributed as a very thin film throughout the ore material.

The sulphating operation has been substantially completed during this single stage, but if iron oxide is present in the roasted ore material, then the acid treated mass will contain ferrous and/or ferric sulphate depending upon the condition of the roasted ore. It is feasible in accordance with this invention to leach or dissolve all of the solubilized sulphates from the ore material at this point and then separate them by suitable procedure. That would involve having the iron, copper, and zinc sulphates all in the solution and serially precipitating them as suitable compounds. It is, however, preferred to treat the ore material prior to any leaching operation by heating it to a temperature at which any iron sulphate present is dissociated with the formation of iron oxide and sulphur oxygen gases, sufficient air being preferably provided to assure that the iron oxide is in the ferric condition so that it will be insoluble in the leaching bath later employed. The temperature should be low enough to prevent decomposing the zinc sulphate.

This calcining step may comprise heating the ore material in a suitable apparatus for about ½ hour, more or less, at a dull red heat, such as a temperature of approximately 550° C., and with an excess of air to convert the iron sulphates to ferric oxide. This temperature may be widely varied depending upon the nature of the material to be treated and the results desired. The calcining or heating apparatus may be of the general type of that used for roasting the ore or of any required form. During this treatment, the zinc and copper sulphates will remain undecomposed if the temperature is sufficiently low, as is desired. If the heating treatment has been carried on at such a high temperature as to decompose some of the copper sulphate and form copper oxide, nevertheless this copper oxide may be later dissolved in an acid leaching step and thus removed from the ore material. The sulphur oxygen gases derived from the iron sulphate may be conducted to any suitable apparatus for recovery as sulphuric acid or for use as required.

One desirable result obtained during this heating treatment is the decomposition of any silicic acid which has been produced by the reaction of the sulphuric acid upon metal silicates in the ore material. This silicic acid is gelatinous and will render it extremely difficult to filter a solution containing the same. However, the heat treatment is conducted at a temperature which is high enough to decompose the silicic acid and convert it into silica which thus remains with the ore residue during a leaching operation.

In order to calcine the acid treated ore materials and decompose the iron sulphates, the wet material will have to be dried, since otherwise it will stick to the heated surfaces of the calciner. It is found that a considerable saving of expense is had if the wet slurry containing the ore, acid and water is mixed with a sufficient amount of dry ore material taken from a previous calcining operation. This dry material will absorb the water from the slurry sufficiently to allow the mixture to be introduced into the calcining furnace without it sticking to the surfaces of the furnace. Since the calcined ore material is to be later treated with a leaching solution, then for this purpose, it is desirable that the material be in a very finely divided condition in order that the leaching reagents may have full access to the ore values. It is found that a doubly beneficial result is obtained by screening the calcined ore material and sending the larger particles back for mixture with the slurry to dry the same and to pass the finer material to the leaching tank. A grinding operation may be interposed prior the leaching, if desired.

After the operation of calcining the material to decompose the iron sulphate and silicic acid, the zinc and copper sulphates may be readily dissolved from the finely divided ore material by means of cold water in which the lead sulphate and ferric oxide are insoluble. Suitable apparatus, such as pachucha, may be employed. It is found that substantially 100% of the zinc and copper is recovered from the ore. These may be separated by any suitable procedure and the zinc and copper recovered as desired compounds. For example, zinc metal will precipitate copper or the copper may be removed by treating the solution with $SO_2$ or $H_2SO_3$ and then adding $H_2S$ or an alkali metal sulphide and heating, which serves to precipitate the copper as cuprous sulphide and leaves the zinc in solution as a sulphate. After filtration, the zinc may be precipitated by adding sodium carbonate and hydroxide to the solution, thus forming the hydroxycarbonate of the variable formula $xZnCO_3.yZn(OH)_2$, depending upon the proportions of the reagents and the conditions of the process as is known to those skilled in the art. Other suitable steps may be taken for the purpose of separating the desired elements and removing the impurities from their solutions.

The ore residue, which may be left in a wet condition after the zinc and copper have been dissolved therefrom, contains lead sulphate and ferric oxide. It is to be appreciated that the lead sulphide was largely converted to a sulphate during the original roasting operation; but if lead oxide was present, it has been converted to the sulphate by the acid treatment. The lead may now be leached from the ore residue by means of a hot alkali metal chloride brine. For example, the ore material may be treated in a suitable leaching apparatus with a 90% saturated brine of sodium chloride in water at a temperature of 75° C. or higher, whereby the lead sulphate is dissolved therein. The lead may be recovered after separation from the ore material by cooling the solution, in which case there is crystallized out a complex lead sodium chloride of the formula $xPbCl_2.yNaCl$, which leaves $Na_2SO_4$ in solution. Or, if desired, the lead may be precipitated from its hot salt brine solution by any suitable reagent, such as sodium carbonate and/or sodium hydroxide which is capable of forming a lead carbonate or hydroxycarbonate or lead hydroxide. A mixture of the two will form white lead or a compound of the formula $xPbCO_3.yPb(OH)_2$ depending upon the proportions of the reagents and the conditions of the process.

The ore residue contains ferric oxide which is useful for various purposes. It is noteworthy that this iron is left in proper form for use as a pigment, and one feature of the invention involves treating a complex iron and zinc bearing ore material as above described so as to form a residue comprising ferric oxide together with the ore gangue which may be thus used in their intimate mixture as a red pigment.

It will now be appreciated that many variations may be made in this process and that the sulphation of refractory but sulphatable zinc, copper, lead, iron and other compounds by nascent H₂SO₄ may be employed without the various steps above described but in conjunction with other procedure adapted to prepare the ore material for sulphation and for recovering the sulphated material thereafter. If iron is absent, the calcining step may be omitted. If lead is absent, the salt brine step is unnecessary. Also, if other metal values are to be recovered, the process is to be modified accordingly. The process is applicable particularly to the solubilizing of sulphatable ore metal compounds which are refractory to, or are not dissolved by, dilute sulphuric acid, but it of course applies to the solubilizing of any zinc, lead, copper, iron, or other compound, whether simple or complex in its nature, which is capable of being converted to a sulphate thereby. Although zinc and lead are the primary ore metals recovered by the process described above, it will be appreciated that other metals may be the ones desired, and the process will be changed accordingly. For example, the process is applicable to the recovery of copper sulphate from a sulphatable copper ore material which may be leached with sulphuric acid by the two step method above described instead of the usual one step of adding dilute acid directly to the ore. The claims are therefore to be construed as covering broadly the sulphation of a sulphatable metal compound by means of nascent ionized sulphuric acid without regard to the nature of the material being treated or to what other steps are desired in connection with the process.

It is also to be understood that considerable latitude is allowed as to the concentration of the sulphuric acid used. For ideal conditions the acid should be 100%; or oleum comprising concentrated 100% sulphuric acid containing a further amount of dissolved sulphur trioxide would be eminently serviceable and especially if the ore contained some moisture. We, however, find it satisfactory to use a 98% acid or one which is even more dilute. However, the stronger the acid, the greater will be the nascent ionization and the heat of hydration for any given addition of water. It is this heat of hydration and the nascent, highly reactive, freshly ionized condition of the acid which result in the sulphation of the refractory ore values. Hence, although the 100% anhydrous acid is desired, yet practical considerations in the plant operation may require that the acid be of less strength, and such concentrated acids are therefore to be classed as being substantially anhydrous in character, provided the subsequent addition of water thereto, as above described, gives the desired results. The claims are to be interpreted accordingly, and not as limited to any particular strength of acid provided it is sufficiently concentrated to give the necessary ionization and heat of hydration to suphate the ore values.

We claim:

1. The method of treating a complex ore containing lead, zinc and iron sulphides comprising the steps of roasting the material under oxidizing conditions and at a temperature sufficient to cause the ore material to burn and form zinc and lead oxygen compounds and ferric oxide, thereafter wetting the ore material with substantially anhydrous sulphuric acid and then adding a controlled amount of water to form nascent ionized sulphuric acid and cause solubilization of substantially all of the zinc, lead and iron compounds present as sulphates, heating the sulphated material at a temperature at which the iron sulphate is decomposed and with sufficient oxygen to form ferric oxide therefrom, subsequently leaching the ore material with cold water to remove zinc sulphate therefrom, thereafter treating the ore residue with a hot alkali metal chloride brine to dissolve the lead sulphate, and recovering lead and zinc compounds from their solutions.

2. The method of treating an ore material containing refractory sulphatable metal compounds comprising the steps of first intimately mixing the ore material in granular condition with substantially anhydrous sulphuric acid proportioned to convert the sulphatable compounds to sulphates, then adding water to said acid in situ within the ore at a controlled rate and in a limited quantity sufficient only to dilute said acid and cause said compounds to be sulphated and thereby forming a hot, moist, granular material within which the freshly diluted acid sulphates substantially all of the sulphatable ore values and forms the metal sulphates, and after the completion of the sulphating operation leaching out the solubilized ore values.

3. The method of treating an ore material containing metal sulphides comprising the steps of roasting the material under oxidizing conditions, then mixing the ore material in a granular condition with substantially anhydrous sulphuric acid in quantity proportioned to sulphate all of the sulphatable metal compounds therein, then adding water at a controlled rate and in a limited amount to dilute said acid in situ and provide a hot, moist ore material within which nascent ionized sulphuric acid is formed and caused to convert substantially all of the sulphatable compounds to sulphates, and thereafter treating the ore with an aqueous solvent and dissolving a metal sulphate from the ore residue.

4. The method according to claim 3 in which the quantity of water added is substantially equal to the amount of anhydrous sulphuric acid present.

5. The method of treating an ore material containing sulphatable compounds of iron and a metal value comprising the steps of wetting the material in granular condition with substantially anhydrous sulphuric acid in amount proportioned to sulphate the desired values, thereafter adding a controlled amount of water to the acid wet material so as to form a hot, moist ore material within which nascent, ionized sulphuric acid is caused to react and form the sulphates of iron and the valuable metal, calcining the sulphated material under oxidizing and temperature conditions where the iron sulphate is not stable and forming ferric oxide therefrom and subsequently dissolving the other metal sulphate in an aqueous solution and separating it from the iron oxide.

6. The method of treating a sulphide ore containing zinc and iron sulphides comprising the steps of roasting the ore under non-sintering, oxidizing conditions, then mixing the material in granular condition with substantially anhydrous sulphuric acid proportioned to sulphate the desired values, thereafter adding to the acid wet ore material a definite amount of water which is sufficient to form a hot moist ore material containing nascent, ionized sulphuric acid largely within the pore spaces of the ore material wherein it reacts to convert zinc and iron compounds to sulphates, thereafter calcining the material with air at a temperature at which any iron sulphate present is decomposed and converted to ferric oxide, and ultimately dissolving zinc sulphate from the ore material and thereby separating it from the iron oxide.

7. The method of claim 3 in which the wet ore material derived from the treatment with acid and water is intermixed with roasted ore material derived from a previous heat treatment in quantity sufficient to dry the wet material satisfactorily for the sulphating operation.

8. The method of treating an ore material containing a refractory sulphatable metal compound and an acid soluble metal silicate comprising the steps of first intimately mixing the ore material in granular condition with substantially anhydrous sulphuric acid proportioned to convert all of the sulphatable compounds to sulphates, then adding water to the acid wet ore at a controlled rate and in limited quantity sufficient only to dilute the acid in situ and form a hot, moist, granular material within which the freshly diluted acid attacks the ore values and forms a metal sulphate and silicic acid, thereafter calcining the sulphated material at a temperature at which the silicic acid is decomposed to form silica, and ultimately dissolving the soluble sulphates in an aqueous solution and separating the solution from the ore residue and silica therein.

9. The method of treating an ore material containing refractory zinc and iron compounds which are not readily soluble in dilute sulphuric acid comprising the steps of wetting the ore material with substantially anhydrous sulphuric acid proportioned to convert all of the sulphatable compounds to sulphates, then adding water to the acid wet ore at a regulated rate and in a limited amount sufficient to cause the sulphuric acid to become ionized and act upon the ore material in a heated nascent condition and form zinc and iron sulphates, thereafter drying the material and heating it with air under temperature conditions which serve to decompose the iron sulphate and form ferric oxide, and subsequently dissolving the zinc sulphate in water and separating it from the ferric oxide and ore residue.

10. The method of making an iron oxide pigment from an ore material containing sulphatable compounds of iron and a valuable metal comprising the steps of first intimately mixing the ore material in granular condition with substantially anhydrous sulphuric acid proportioned to convert all of the sulphatable compounds to sulphates, then adding water to the acid wet ore in a limited quantity sufficient to dilute the acid and form a hot, moist, granular material within the pores of which substantially all of the dilute acid is contained and causing the formation of the sulphates of said metals, thereafter heating the sulphated material with air at a temperature at which iron sulphate is converted to ferric oxide and ultimately dissolving and removing the sulphates of the metal values and thereby providing a residue of ore material containing ferric oxide suitable for use as a pigment.

11. The method of sulphating a complex ore material comprising the steps of wetting the ore material in a substantially dry and granular condition first with substantially anhydrous sulphuric acid in amount proportioned to sulphate the desired ore values and then adding thereto a definite amount of water to dilute the acid and thus cause a controlled solubilization of ore metal values as sulphates, thereafter mixing the wet ore material with a sufficient amount of previously calcined material to provide a substantially dry material therefor, then calcining the mixture under oxidizing conditions to decompose any iron sulphate or silicic acid therein and cause the evolution of a sulphur oxygen gas in intimate and reactive association with the ore material, and leaching the calcined product for the recovery of the desired metal sulphate.

12. The method of treating an ore containing sulphides of metals of the group consisting of zinc, copper, lead and iron comprising the steps of roasting the ore with air to form oxygen compounds of the metals, wetting the ore in a granular condition with a sufficient amount of substantially anhydrous sulphuric acid to form sulphates of the sulphatable values in the ore material, thereafter, but prior to the sulphating step, adding water to said acid in situ in amount only sufficient to form a highly reactive acid within the pores of the ore material, while regulating the rate of water addition so as to cause the reaction to proceed at a violent but controlled rate and thereby sulphating substantially all of the sulphatable compounds of said metals, and thereafter treating the ore material with an aqueous solvent to separate an ore metal sulphate from the residue.

13. The method of treating an ore material containing the sulphides of iron and a valuable metal comprising the steps of claim 12 and wherein the wet ore material, following the acid treatment, is dried and calcined with air at a temperature at which any iron sulphate present is converted to ferric oxide and sulphur trioxide is evolved in intimate association with the ore material where it may aid in sulphating the refractory values.

ROYAL L. SESSIONS.
DONALD C. MITCHELL.